March 18, 1958     G. C. WARDRIP     2,826,852
FINGER GRIP ATTACHMENT FOR FISHING RODS
Filed Aug. 12, 1957
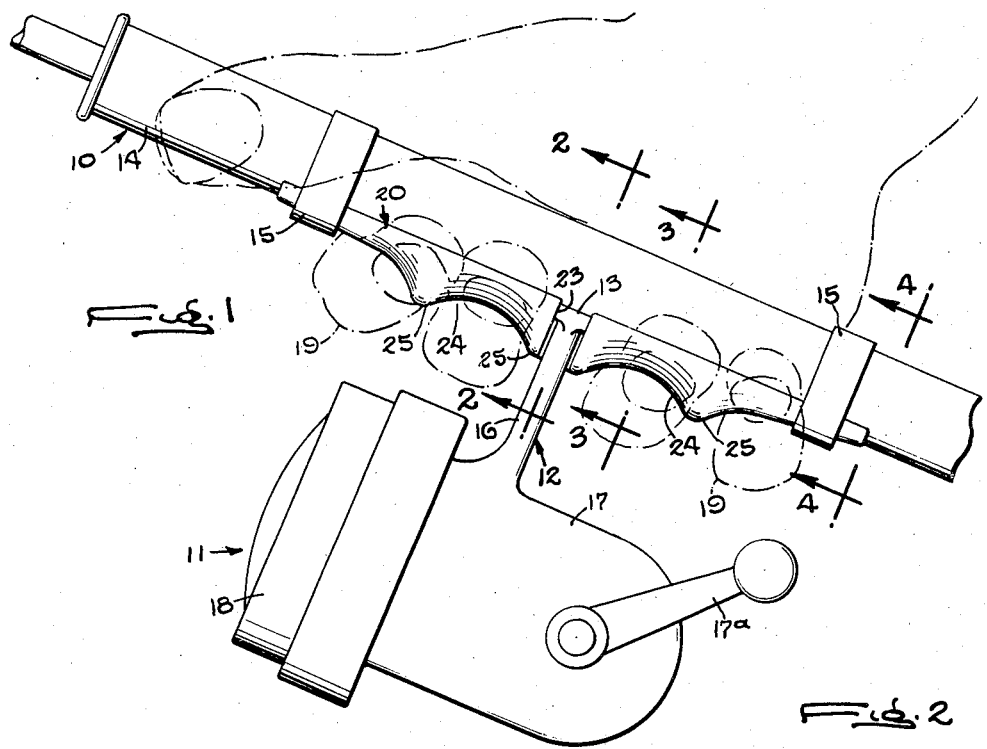
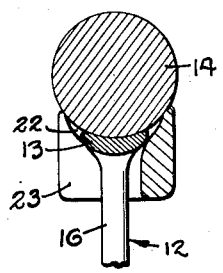
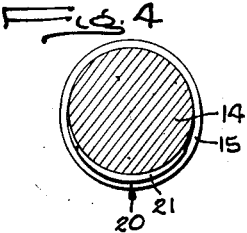
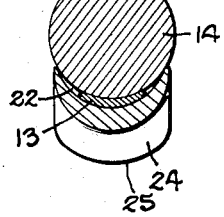
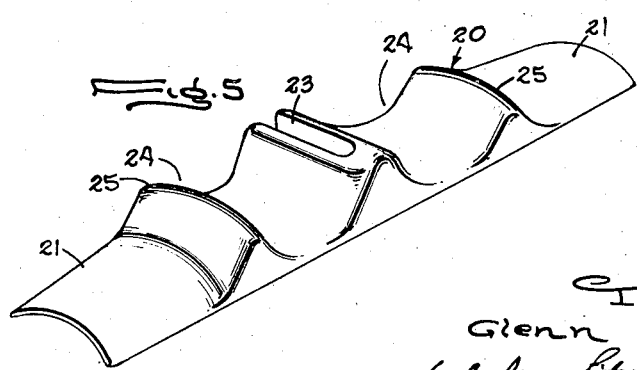
INVENTOR
Glenn C. Wardrip
by Carlson, Pitzner, Hubbard + Wolfe
ATTORNEY

2,826,852

FINGER GRIP ATTACHMENT FOR FISHING RODS

Glenn C. Wardrip, Poplar Grove, Ill.

Application August 12, 1957, Serial No. 677,543

4 Claims. (Cl. 43—22)

This invention relates to an attachment for the handle of a fishing rod intended for use with a so-called spinning reel. Such a reel usually is spaced laterally from the portion of the handle gripped by the user and is supported thereon by a T-shaped mounting bracket projecting from the reel and having a cross-bar which is secured detachably to the handle.

The primary object of the invention is to provide a finger grip attachment which is especially adapted for use on the handle of a fishing rod having a spinning reel and is constructed in a novel manner to avoid fatigue of the hand of the user holding the handle, reduce the tendency of interference between the user's fingers grasping the handle and the fingers operating the crank of the reel, and prevent turning of the rod in the user's hand during casting.

Another object is to construct the attachment in a novel manner to accommodate a large number of spinning reels having mounting brackets of different sizes.

Other objects and advantages of the invention will become apparent from the following detailed description taken in connection with the accompanying drawings, in which—

Figure 1 is a fragmentary side elevational view of a fishing rod equipped with a finger grip attachment embodying the novel features of the present invention.

Figs. 2, 3 and 4 are sectional views taken respectively along the lines 2—2, 3—3 and 4—4 of Fig. 1.

Fig. 5 is a perspective view of the attachment.

The present invention is especially adapted for use with a fishing rod 10 and a so-called spinning reel 11 having a T-shaped mounting bracket 12. The cross bar 13 of the latter is curved transversely along its length to fit against the cylindrical exterior of the handle 14 of the rod. Opposite ends of the cross bar are clamped against the handle by suitable mounting means such as cylindrical rings 15 encircling and shiftable axially along the handle. The rings are enough larger in diameter than the handle to receive the ends of the cross bar and wedge the same against the handle.

At the lower end of its center bar 16, the reel bracket 12 is rigid with a housing 17 which, forwardly of the bracket, supports a spool 18 for rotation about an axis extending longitudinally of the cross bar 13 and thus of the rod 10 when the bracket is secured to the handle 14. The spool is geared to a crank 17a journaled in the side of the housing. In service use of a rod and the spinning type of reel, the latter is disposed beneath the rod and the user grasps the handle in his right hand with the fingers 19 wrapped around the handle and the cross bar and straddling the depending center bar 16 as indicated in dotted outline in Fig. 2. The left hand then is free to manipulate the crank.

To prevent turning of the handle 14 in the user's hand during casting and to avoid fatigue of that hand with the gripping hand and interference of that hand with the cranking hand, the present invention contemplates the provision of a novel finger grip attachment 20 adapted to be clamped to the handle rigidly with the cross bar 13 of the bracket 12. When so clamped, the attachment projects eccentrically from the handle between the latter and the reel and enlarges the cross sectional area of the parts gripped by the user's right hand. Being disposed between the handle and the reel 11, the attachment tends to locate the end joints of the fingers beneath the handle and therefore out of the path of the crank 17a alongside the handle.

Generally, the improved attachment 20 comprises an elongated body curved transversely along its length to provide a concave side complementary to and adapted to fit around the exterior of the handle 14. At opposite end portions 21, the body tapers outwardly to a thin arcuate cross section so as to fit between the handle and the mounting rings 15 and become wedged tightly against the handle when the rings are shifted axially toward each other and over the ends of the body.

Intermediate the end portions 21, the concave side of the body 20 is recessed longitudinally as indicated at 22 in Figs. 2 and 3 to receive the cross bar 13 of the reel mounting bracket 12 and clamp the same against the handle 14. When the cross bar is inserted into the recess, the center bar 16 of the bracket is received in a slot 23 extending transversely into the recess from the center of one longitudinal edge of the body. To accommodate reels of different manufacturers having cross bars of various lengths and cross sectional shapes, the recess is deepest adjacent its longitudinal and transverse center and gradually becomes more shallow from the center to the end portions and the longitudinal edges of the body.

On the convex side of the body 20 opposite the recess 22 for the cross bar 13, recesses 24 are defined by projections 25 to receive the fingers 19 of the user's right hand. Herein, the projections constitute thickened portions spaced along and extending across the body. There are three such projections providing four recesses, the transverse slot 23 being cut through the center projection.

To mount the reel 11 on the rod handle 14 using the improved attachment 20, the cross bar 13 of the mounting bracket 12 is laid in the elongated recess 22 as permitted by extension of the center bar 16 through the transverse slot 23. Then, with the mounting rings 15 separated, the body is shifted to bring the end portions 21 and the cross bar against the handle between the rings. Finally, the latter are shifted axially toward each other and over the end portions 21 until the body is wedged tightly against the handle, the cross bar then being clamped rigidly between the handle and the body and the center bar 16 abutting the end of the transverse slot.

With the bracket 12 and the attachment 20 clamped to the handle 14 as described above, the attachment provides an eccentric on the handle enabling the user to retain close control over the handle and prevent the same from turning during casting. Also, the parts gripped by the user's right hand are enlarged so as to avoid fatigue and the end joints of the user's fingers are located between the handle and the reel housing 17 where they are not likely to be contacted by the user's crank hand. Due to the taper of the end portions 21 of the body and of the recess 22 on the concave side thereof, the attachment is adapted for use with reel bracket and handles of widely varying dimensions. In addition to these advantages, the attachment may be formed easily and inexpensively, for example, by molding a suitable thermosetting resinous material.

I claim as my invention:

1. An attachment for use with a spinning reel having a T-shaped mounting bracket and a fishing rod having a handle with a convex exterior and mounting means for securing the bracket to the handle, said attachment comprising an elongated body curved transversely throughout its length to provide a concave side complementary in shape to the exterior of the fishing rod handle and adapted at opposite ends to fit into the mounting means and be clamped thereby against the handle, said body having a convex side and being recessed on said concave side intermediate the ends of the body for receiving the cross bar of the T-shaped reel mounting bracket and clamping the same against the handle when the attachment is clamped thereto by the mounting means, means on said body intermediate the ends thereof defining a slot opening transversely from a longitudinal edge of the body and extending partially across the latter and into said recess to receive the center bar of the reel mounting bracket when the cross bar is disposed in the recess, and projections formed on the side of said body opposite said concave side and spaced longitudinally of the body to define finger receiving recesses, said attachment projecting eccentrically from the handle to facilitate control of the angular position of the handle about its axis.

2. An attachment for use with a spinning reel having a T-shaped mounting bracket and a fishing rod having a handle with a convex contour and two axially shiftable rings for securing the reel to the handle, said attachment comprising an elongated body curved transversely throughout its length to form a concave side complementary in shape to the exterior of the fishing rod handle and tapered at opposite ends to fit between the handle and the rings and be wedged by the latter against the handle, said body having a convex side and a recess on said concave side intermediate the ends of the body for receiving the cross bar of the T-shaped reel mounting bracket and clamping the same against the handle when the attachment is clamped thereto by the mounting means, and means intermediate the ends of said body defining a slot opening transversely from a longitudinal edge of the body and into said recess to receive the center bar of the reel mounting bracket when the cross bar is disposed in the recess, said attachment projecting eccentrically from the handle to facilitate control of the angular position of the handle about its axis.

3. An attachment for use with a spinning reel having a T-shaped mounting bracket and a rod having a handle and mounting means for securing the reel to the handle, said attachment comprising an elongated body curved transversely throughout its length to form a concave side complementary in shape to the exterior of the fishing rod handle and adapted at opposite ends to fit into the mounting means and be clamped thereby against the handle, said body having a convex side and being recessed on said concave side intermediate the ends of the body for receiving the cross bar of the T-shaped reel mounting bracket and clamping the same against the handle when the attachment is clamped thereto by the mounting means, and means intermediate the ends of said body defining a slot opening transversely from a longitudinal edge of the body and into said recess to receive the center bar of the reel mounting bracket when the cross bar is disposed in the recess, said attachment projecting eccentrically from the handle to facilitate control of the angular position of the handle about its axis and said recess decreasing in depth from the center of the body to accommodate cross bars of different dimensions.

4. An attachment for use with a spinning reel having a T-shaped mounting bracket and a rod having a handle with a convex contour and mounting means for securing the reel to the handle, said attachment comprising an elongated body curved transversely throughout its length to form a concave side complementary in shape to the exterior of the fishing rod handle and adapted at opposite ends to fit into the mounting means and be clamped thereby against the handle, said body having a convex side and a recess on said concave side intermediate the ends of the body for receiving the cross bar of the T-shaped reel mounting bracket and clamping the same against the handle when the attachment is clamped thereto by the mounting means, and means intermediate the ends of said body defining a slot opening transversely from a longitudinal edge of the body and into said recess to receive the center bar of the reel mounting bracket when the cross bar is disposed in the recess, said attachment projecting eccentrically from the handle to facilitate control of the angular position of the handle about its axis.

No references cited.